United States Patent
Cho et al.

(10) Patent No.: US 10,778,423 B2
(45) Date of Patent: Sep. 15, 2020

(54) REUSABLE FUZZY EXTRACTOR BASED ON THE LEARNING-WITH-ERROR ASSUMPTION SECURE AGAINST QUANTUM ATTACKS

(71) Applicant: HRL Laboratories, LLC, Malibu, CA (US)

(72) Inventors: Chongwon Cho, Los Angeles, CA (US); Karim El Defrawy, Santa Monica, CA (US); Daniel C. Apon, College Park, MD (US); Jonathan Katz, Silver Spring, MD (US)

(73) Assignee: HRL Laboratories, LLC, Malibu, CA (US)

( * ) Notice: Subject to any disclaimer, the term of this patent is extended or adjusted under 35 U.S.C. 154(b) by 206 days.

(21) Appl. No.: 15/980,722

(22) Filed: May 15, 2018

(65) Prior Publication Data
US 2020/0145206 A1    May 7, 2020

Related U.S. Application Data

(60) Provisional application No. 62/533,548, filed on Jul. 17, 2017, provisional application No. 62/533,572, filed on Jul. 17, 2017.

(51) Int. Cl.
*H04L 9/08* (2006.01)
*H04L 9/32* (2006.01)
*H04L 9/00* (2006.01)

(52) U.S. Cl.
CPC ........... *H04L 9/0866* (2013.01); *H04L 9/002* (2013.01); *H04L 9/3231* (2013.01)

(58) Field of Classification Search
CPC . H04L 9/3231; H04L 9/0863; H04L 63/0861; H04L 63/083; G06F 21/32
See application file for complete search history.

(56) References Cited

U.S. PATENT DOCUMENTS

| 2012/0033807 A1* | 2/2012 | Asim | G06F 21/32 |
| | | | 380/44 |
| 2014/0177828 A1* | 6/2014 | Loftus | H04L 9/008 |
| | | | 380/44 |

(Continued)

FOREIGN PATENT DOCUMENTS

WO    WO2015-184991 A1    12/2015

OTHER PUBLICATIONS

Oded Regev, "The Learning with Errors Problem", Jun. 9, 2010, Proceedings of the 2010 IEEE 25th Annual Conference on Computation Complexity, p. 191-204. (Year: 2010).*

(Continued)

*Primary Examiner* — Nelson S. Giddins
(74) *Attorney, Agent, or Firm* — Tope-McKay & Associates

(57) ABSTRACT

Described is a system for biometric based security. The system converts biometric data into a cryptographic key using a reusable fuzzy extractor process. The reusable fuzzy extractor process comprises a generation process and a reconstruction process. The generation process takes as input a public parameter and a first biometric input and outputs a public helper string and a first random string. The reconstruction process takes as input a public helper string and a second biometric input and outputs a second random string. The reusable fuzzy extractor process is reusable such that multiple public helper strings do not reveal any information about the first biometric input and the first random string. Secured data is unlocked by applying the cryptographic key for biometric security of access to secured data.

22 Claims, 7 Drawing Sheets

(56) References Cited

U.S. PATENT DOCUMENTS

| | | | |
|---|---|---|---|
| 2015/0318994 | A1 | 11/2015 | Walsh et al. |
| 2016/0021096 | A1 | 1/2016 | Wallrabenstein |
| 2016/0277395 | A1* | 9/2016 | Palzon Romero .......................... H04L 63/0428 |
| 2018/0302414 | A1* | 10/2018 | Wagner ................. H04L 63/107 |

OTHER PUBLICATIONS

Xavier Boyen, "Reusable Cryptographic Fuzzy Extractors", Oct. 20004, Proceedings of the 11th ACM Conference on Computer and communications security, p. 82-91. (Year: 2004).*
Notification and International Preliminary Report on Patentability (Chapter I) for PCT/US2018/032847; dated Jan. 30, 2020.
Charles Herder and Benjamin Fuller and Marten van Dijk and Srinivas Devadas, Public Key Cryptosystems with Noisy Secret Keys, Cryptology ePrint Archive, Report 2017/210, 2017, pp. 1-36.
Xavier Boyen. Reusable cryptographic fuzzy extractors. In ACM CCCS '04: 11th ACM Conf. on Computer and Communications Security, pp. 82-91. ACM Press, 2004.
Ran Canetti, Benjamin Fuller, Omer Paneth, Leonid Reyzin, and Adam D. Smith. Reusable fuzzy extractors for low-entropy distributions. In Advances in Cryptology—Eurocrypt 2016, Part I, vol. 9665 of LNCS, pp. 117-146. Springer, 2016.
Oded Regev. On lattices, learning with errors, random linear codes, and cryptography. In Harold N. Gabow and Ronald Fagin, editors, 37th Annual ACM Symposium on Theory of Computing (STOC), pp. 84-93. ACM Press, May 2005.
Mihir Bellare and Phillip Rogaway. 1993. Random oracles are practical: a paradigm for designing efficient protocols. In Proceedings of the 1st ACM conference on Computer and communications security (CCS '93). ACM, New York, NY, USA, pp. 62-73.
Benjamin Fuller, Xianrui Meng, and Leonid Reyzin. Computational fuzzy extractors. In Advances in Cryptology—Asiacrypt 2013, Part I, vol. 8269 of LNCS, pp. 174-193. Springer, 2013.
Mihir Bellare and Phillip Rogaway. Random oracles are practical: a paradigm for designing efficient protocols. In Proceedings of the 1st ACM conference on Computer and communications security (CCS '93). ACM, New York, NY, USA, pp. 62-73, 1993.
Ran Canetti, Oded Goldreich, and Shai Halevi. 2004. The random oracle methodology, revisited. J. ACM 51, 4 (Jul. 2004), pp. 557-594. DOI=http://dx.doi.org/10.1145/1008731.1008734.
Shafi Goldwasser, Yael Kalai, Chris Peikert and Vinod Vaikuntanathan, Robustness of the learning with errors assumption, In Proceedings of the 40th annual ACM symposium on Theory of computing, In: ICS, pp. 230-240, 2010.
Daniele Micciancio and Michael Walter, Gaussian Sampling over the Integers: Efficient, Generic, Constant-Time, Cryptology ePrint Archive, Report 2017/259, 2017, pp. 1-28.
Notification of Transmittal of International Search Report and The Written Opinion of The International Searching Authority for PCT/US2018/032847; dated Sep. 10, 2018.
International Search Report of The International Searching Authority for PCT/US2018/032847; dated Sep. 10, 2018.
Written Opinion of The International Searching Authority for PCT/US2018/032847; dated Sep. 10, 2018.
Ran Canetti et al. 'Reusable Fuzzy Extractors for Low-Entropy Distributions', Feb. 25, 2016, pp. 1-7, <https://eprint.iacr.org/2014/243.pdf>.

* cited by examiner

REUSABLE FUZZY EXTRACTOR BASED ON THE LEARNING-WITH-ERROR ASSUMPTION SECURE AGAINST QUANTUM ATTACKS

GOVERNMENT LICENSE RIGHTS

This invention was made with government support under U.S. Government Contract Number 2016-16081000009. The government may have certain rights in the invention.

CROSS-REFERENCE TO RELATED APPLICATIONS

This is a Non-Provisional patent application of U.S. Provisional Application No. 62/533,572, filed in the United States on Jul. 17, 2017, entitled, "Reusable Fuzzy Extractor Based on the Learning-With-Error Assumption Secure Against Quantum Attacks," the entirety of which is hereby incorporated by reference.

This is ALSO a Non-Provisional patent application of U.S. Provisional Application No. 62/533,548, filed in the United States on Jul. 17, 2017, entitled, "Practical Reusable Fuzzy Extractor Based on the Learning-With-Error Assumption and Random Oracle," the entirety of which is hereby incorporated by reference.

BACKGROUND OF INVENTION

(1) Field of Invention

The present invention relates to a reusable fuzzy extractor (RFE) cryptographic system and, more particularly, to a RFE cryptographic system, which can be implemented with simple and efficient operations.

(2) Description of Related Art

Fuzzy extractors (FEs) convert biometric data into random strings, which makes it possible to apply cryptographic techniques for biometric security. Fuzzy extractors convert repeated noisy readings of a secret into the same uniformly distributed key. To eliminate noise, an initial enrollment phase takes the first noisy reading of the secret and produces a nonsecret helper string to be used in subsequent readings. Reusable fuzzy extractors (RFEs) remain secure even when this initial enrollment phase is repeated several times with noisy versions of the same secret, producing multiple helper strings.

There have been results using previous RFEs (see the List of Incorporated Literature References, Literature Reference Nos. 1-3), which are all believed to be secure against quantum adversaries. The RFEs in Literature Reference No. 2 are secure under Boyen's notion of RFE; however, this security can be improved upon. Both Literature Reference Nos. 1 and 3 describe reusable fuzzy extractors that could be considered impractical as they rely on very expensive cryptographic tools, such as a digital locker (see Literature Reference No. 3) or multilinear graded encoding (see Literature Reference No. 1). The cryptographic tools result in very large public strings (larger than 50~100 Megabytes (MB)) and slow the running times for the generation (Gen) and reconstruction (Rec) algorithms.

Thus, a continuing need exists for a RFE which offers improved performance compared to previous works.

SUMMARY OF INVENTION

The present invention relates to a reusable fuzzy extractor (RFE) cryptographic system and, more particularly, to a RFE cryptographic system, which can be implemented with simple and efficient operations. The system comprises a scanner configured to provide biometric data and one or more processors and a non-transitory computer-readable medium having executable instructions encoded thereon such that when executed, the one or more processors perform multiple operations. The system converts biometric data into a cryptographic key using a reusable fuzzy extractor process, wherein the reusable fuzzy extractor process comprises a generation process and a reconstruction process, wherein the generation process takes as input a public parameter and a first biometric input and outputs a public helper string and a first random string, and wherein the reconstruction process takes as input a public helper string and a second biometric input and outputs a second random string, wherein the reusable fuzzy extractor process is reusable such that multiple public helper strings do not reveal any information about the first biometric input and the first random string.

In another aspect, the reusable fuzzy extractor process is secure against quantum adversaries only under a learning-with-error (LWE) assumption.

In another aspect, when the first biometric input is sufficiently similar to the second biometric input, the first random string is considered equivalent to the second random string, and the second random string is used to verify access to the secured data.

In another aspect, security of the reusable fuzzy extractor process is guaranteed based on a computational hardness assumption of a learning-with-error (LWE) problem.

In another aspect, the biometric data is a fingerprint and the secured data is accessed through a server.

In another aspect, the system performs the generation process for obtaining the public helper string and the first random string; encrypts a message using the first random string as a cryptographic key for a symmetric encryption scheme, resulting in a ciphertext, and stores the public helper string.

In another aspect, the system further comprises a fingerprint scanner for obtaining the biometric data.

In another aspect, the system further comprises an eye scanner for obtaining the biometric data.

In addition, the present invention relates to a reusable fuzzy extractor (RFE) cryptographic system comprising one or more processors and a non-transitory computer-readable medium having executable instructions encoded thereon such that when executed, the one or more processors perform multiple operations. The system receives biometric data from a scanner; obtains a ciphertext with an associated first random string and encrypted message; authenticates the biometric data by performing a reconstruction process which takes as input a public helper string and the biometric data and outputs a second random string; and if the second random string is equivalent to the first random string, then decrypting the ciphertext using the second random string to obtain the message for authentication of the biometric data.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
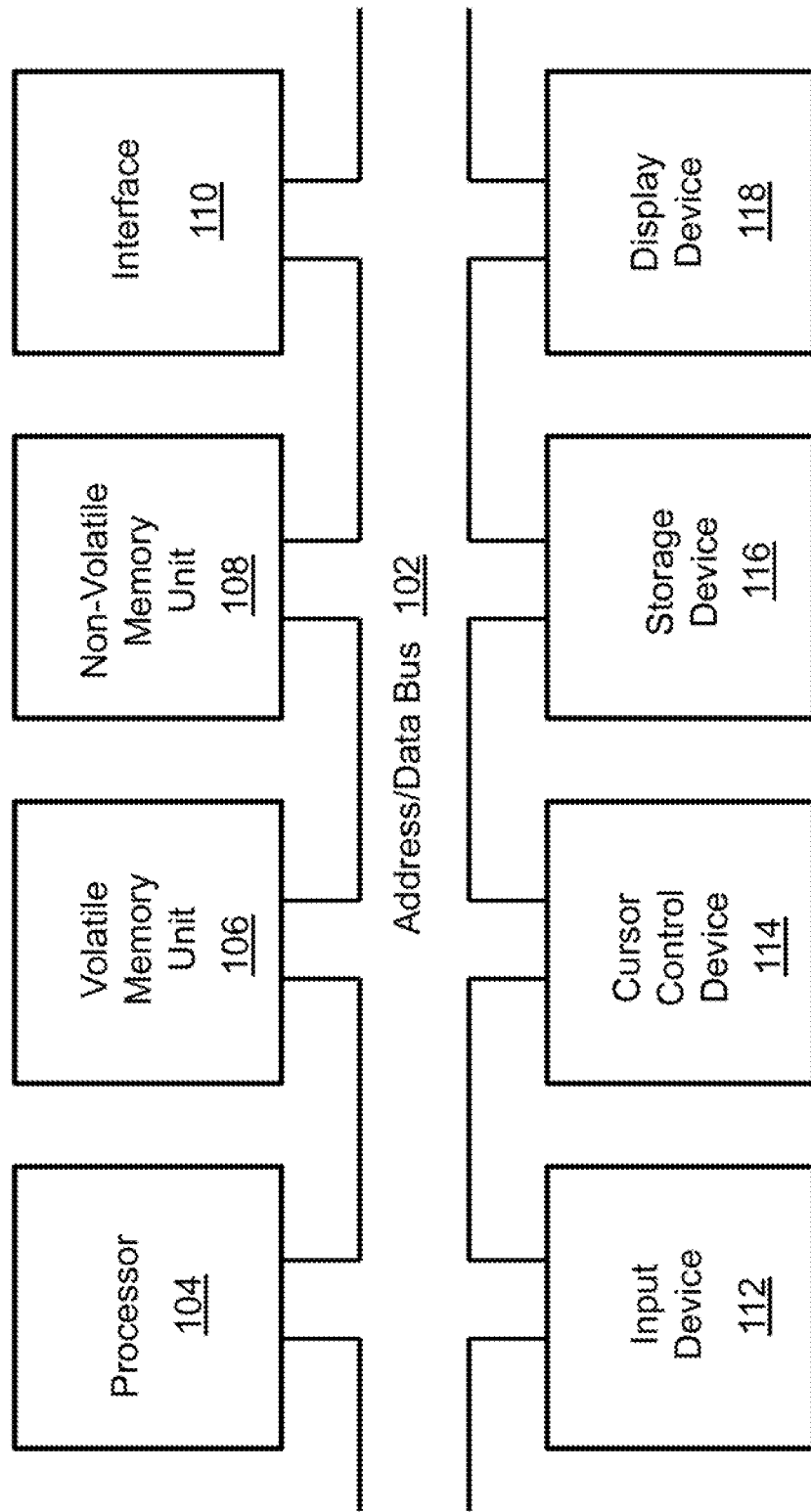
FIG. 1 is a block diagram depicting the components of a reusable fuzzy extractor (RFE) cryptographic system according to some embodiments of the present disclosure.

The present invention relates to a reusable fuzzy extractor (RFE) cryptographic system and, more particularly, to a RFE cryptographic system, which can be implemented with simple and efficient operations. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Charles Herder and Benjamin Fuller and Marten van Dijk and Srinivas Devadas, Public Key Cryptosystems with Noisy Secret Keys, Cryptology ePrint Archive, Report 2017/210, 2017.
2. Xavier Boyen. Reusable cryptographic fuzzy extractors. In ACM CCS '04: 11th ACM Conf. on Computer and Communications Security, pages 82-91. ACM Press, 2004.
3. Ran Canetti, Benjamin Fuller, Omer Paneth, Reyzin, and Adam D. Smith. Reusable fuzzy extractors for low-entropy distributions. In Advances in Cryptology—Eurocrypt 2016, Part I, volume 9665 of LNCS, pages 117-146. Springer, 2016
4. Oded Regev. On lattices, learning with errors, random linear codes, and cryptography. In Harold N. Gabow and Ronald Fagin, editors, 37th Annual ACM Symposium on Theory of Computing (STOC), pages 84-93. ACM Press, May 2005.
5. Mihir Bellare and Phillip Rogaway. Random oracles are practical: a paradigm for designing efficient protocols. In Proceedings of the 1st ACM conference on Computer and communications security (CCS '93). ACM, New York, N.Y., USA, 62-73, 1993.
6. Benjamin Fuller, Xianrui Meng, and Leonid Reyzin. Computational fuzzy extractors. In Advances in Cryptology—Asiacrypt 2013, Part I, volume 8269 of LNCS, pages 174-193. Springer, 2013.
7. Ran Canetti, Oded Goldreich, and Shai Halevi. 2004. The random oracle methodology, revisited. J. ACM 51, 4 (July 2004), 557-594.
8. Shafi Goldwasser, Yael Kalai, Chris Peikert and Vinod Vaikuntanathan, Robustness of the learning with errors assumption, In Proceedings of the 40th annual ACM symposium on Theory of computing, In: ICS, pp. 230-240, 2010.
9. Daniele Micciancio and Michael Walter, Gaussian Sampling over the Integers: Efficient, Generic, Constant-Time, Cryptology ePrint Archive, Report 2017/259, 2017.

(2) PRINCIPAL ASPECTS

Various embodiments of the invention include three "principal" aspects. The first is a reusable fuzzy extractor (RFE) cryptographic system. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
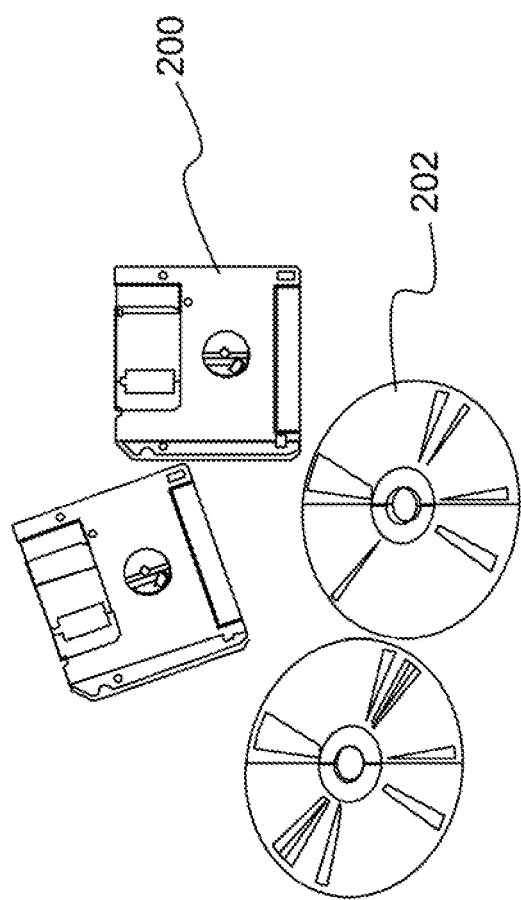
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF VARIOUS EMBODIMENTS

Described is a system for a reusable fuzzy extractor (RFE) without relying on the existence of a random oracle, which is provably secure against quantum computers (quantum adversaries). A RFE is a cryptographic system of a pair of algorithms (Gen, Rec) such that Gen (generation algorithm) takes as an input a biometric feature m and outputs a pair of two strings (pub, r), where pub is a public helper string and r is a random string. Rec (recovery algorithm) takes as inputs two strings, a public string pub and a biometric reading m', and outputs a random string r' such that r=r' if and only if m' is sufficiently close to original m. The reusability of RFE guarantees that the information of random strings r's or m is not revealed by multiple public strings pub's that are independently computed all with respect to the same biometric feature m.

(3.1) Reusable Fuzzy Extractor and Application in Identification System

A reusable fuzzy extractor consists of two algorithms (Gen, Rec). Gen and Rec stand for generation algorithm and reconstruction algorithm, respectively. The syntactic description of these two algorithms is as follows. Gen takes a biometric feature w as an input and outputs a pair of strings (p, r), where p is a public helper string, and r is a private extracted randomness. Algorithm Rec takes as inputs two strings p and w', where p is a public helper string and w' is a query biometric feature. Then, Rec outputs randomness r'. The fuzzy correctness of Rec guarantees that if biometric feature w used to create p is close to the query biometric feature w', then it holds that r=r'. The reusable security guarantees that one can use the noisy biometric feature multiple times to generate multiple public helper strings without any leakage of biometric information.

Figure 3:
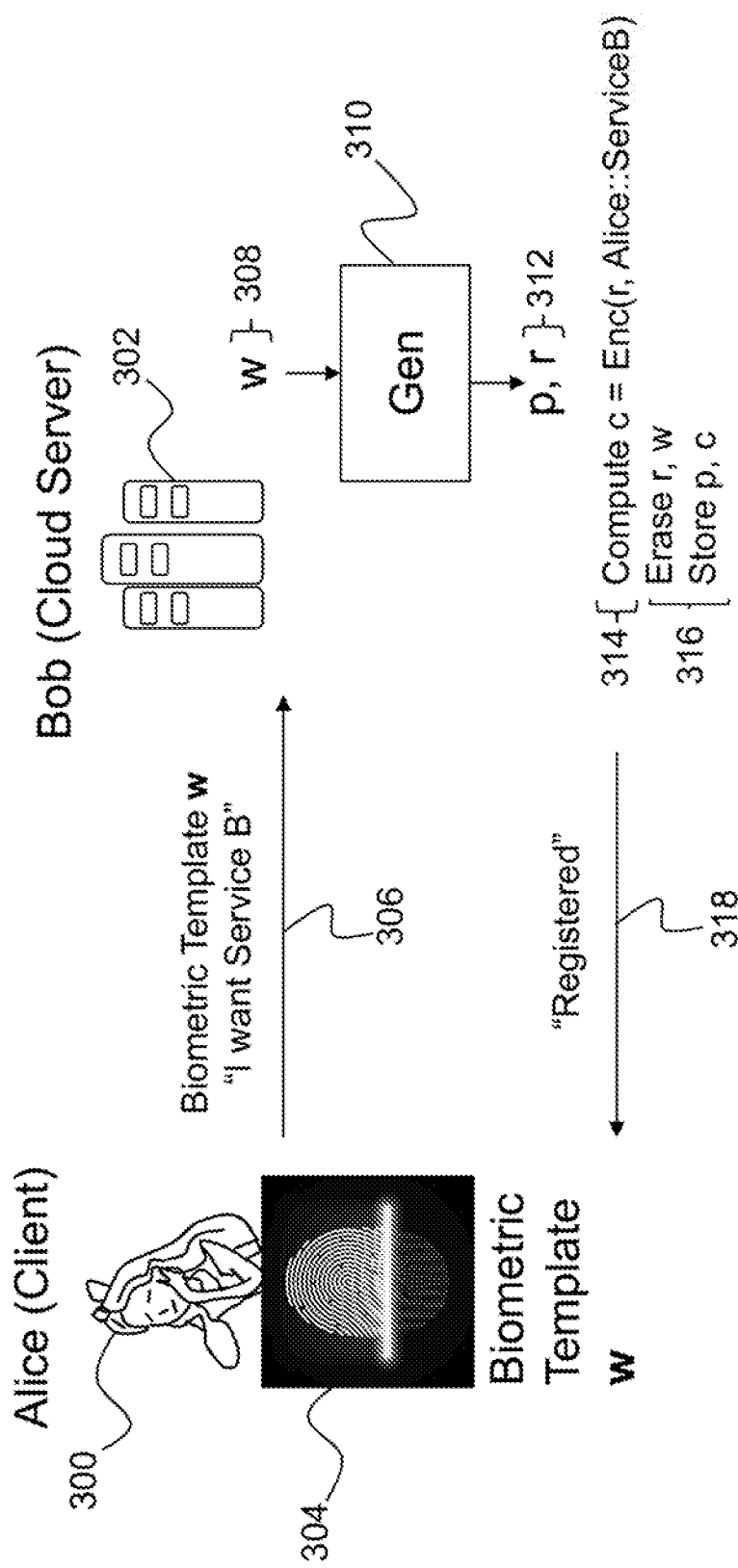
FIG. 3 is an illustration of a registration process based on a RFE according to prior art.
Figure 4:
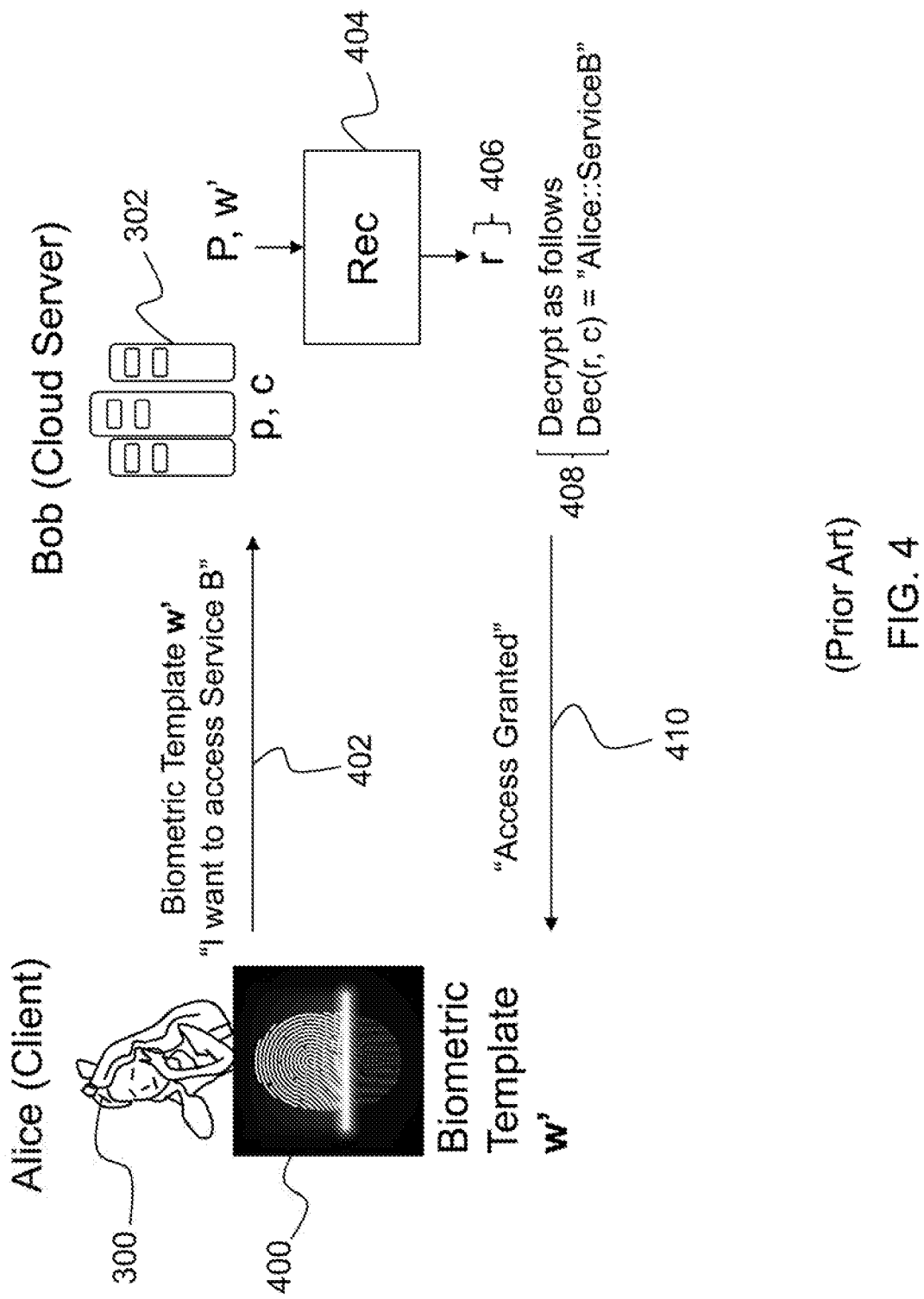
FIG. 4 is an illustration of an identification process based on a RFE according to prior art.

Using this system, one can build a simple biometrics-based identification system. FIGS. 3 and 4 depict an example of the identification system according to prior art, with FIG. 3 illustrating the registration process and FIG. 4 illustrating the identification process. Consider two parties, Alice (client) 300 and Bob (server) 302. Alice 300 wants to enroll by using her biometric information w 304 (e.g., fingerprint) with Bob 302 for some secure data storage service B (element 306). At the initial registration phase (FIG. 3), Alice 300 can use a fingerprint scanner provided by Bob 302 to obtain and send w (element 308) to Bob (element 306). Then, Bob 302 simply runs Gen(w) (element 310) to obtain public helper string p and r (element 312). Bob 302 now encrypts a message "Alice∥ServiceB" under secret key r using any private-key encryption scheme where the resulting ciphertext is c (element 314). Then, Bob erases w and r from the system and only stores p and c (element 316). The biometric template w is now considered registered (element 318).

Note that given p and c, no information about Alice 300 or her biometric data (element 304) is revealed to the adversarial third party even if it completely breaks in the Bob's server 302. As shown in FIG. 4, anytime Alice 300 wants to access her cloud storage of Bob 302, she scans and sends biometric feature w' (element 400) to Bob (element 402). Now Bob 302 can execute Rec(p,w') (element 404), which outputs the original randomness r (element 406) created at the point of initial registration (FIG. 3). Then, Bob 302 can decrypt c by using r as its decryption key to obtain the message "Alice∥ServiceB" (element 408) to find out that the requester is indeed Alice and grants Alice an access to cloud service B (i.e., access granted 410).

(3.2) Settings and Foundational Algorithms

The following is a description of the reusable fuzzy extractor (RFE) in the random oracle model based on LWE assumption. Standard mathematics notions are used. [1,m] denotes a set of all integers starting from 1 up to m. Bold capital letters (e.g., A) denote a matrix over some field and bold lower-case letters (e.g., b) denote a vector of some length. $A^{-1}$ denotes the inverse of matrix A.

The following is a description of the decoding algorithm for a noisy random linear code system, which was proposed by Fuller et. al. (see Literature Reference No. 6). This algorithm is used as a subroutine in the system according to embodiments of the present disclosure. In the following description, A is a m-by-n randomly sampled from field $\mathbb{Z}^{m \times n}$ where m≥3n, t=O(log n) denotes the maximum number of errors, and q is a prime. Crucially, it is assumed that A is a common parameter globally available across the multiple biometric enrollment processes, such that a random single A is designated to a specific individual. Vector b is a vector of length m. Vector e is an error vector of dimension m such that, at most, t coordinates are non-zero. The following describes the Decode algorithm.

---

−s' ← $Decode_t(A,b)$:
1. Select 2n random rows without replacement $i_1, \ldots, i_{2n}$ ← [1, m].
2. Restrict A, b to rows $i_1, \ldots, i_{2n}$; denote those by $A_{i_1}, \ldots, {i_{2n}}$, $b_{i_1}, \ldots, {i_{2n}}$.
3. Find n linearly independent rows of $A_{i_1}, \ldots, {i_{2n}}$. If no such rows exist, output ⊥ and halt.
4. Further restrict $A_{i_1}, \ldots, {i_{2n}}, b_{i_1}, \ldots, {i_{2n}}$ to these n rows; denote the result by A', b'.
5. Compute s' = $(A')^{-1}b'$.
6. If b − As' has more than t nonzero coordinates, restart at Step (1).
7. Output s'.

---

(3.2.1) Decoding Algorithm Decode

The algorithm $Decode_t(A,b)$ takes as input a matrix A in $\mathbb{Z}_q^{m \times n}$ and a vector b of length m and finds a vector s of length n that satisfies b=As+e−e' for some error vectors e and e' of length m, where e−e' has at most t=O(log n) non-zero coordinates.

Step 1. It randomly selects a set of 2n indices between 1 and m

Step 2. It collects the rows and coordinates of input matrix A and vector b, corresponding to the selected indices in Step 1, in order to form a 2n-by-n matrix and vector of length 2n.

Step 3. Find n linearly independent rows in the 2n-by-n matrix formed in Step 2. The output of Step 3 is a n-by-n full rank matrix. Such a full rank matrix is output at this step except with probability at least $1-(\frac{1}{2})^n$.

Step 4. Set this full rank matrix to A' and also set b' to be the vector from 2n length vector in Step 2 according to the same indices as for the rows of A'.

Step 5. Compute s'=$(A')^{-1}b'$. Note that A' is a full rank, so invertible.

Step 6. Compute b−As', where b and A are given as inputs and s' is the output of step 5. If b=As+e−e' and e−e' have at most t non-zero coordinates (in other words, e and e' are sufficiently close), it will lead to output s' in Step 7 of the Decode algorithm.

(3.3) Reusable Fuzzy Extractor Algorithms

Given the description of the Decode algorithm above, the following is a description of the RFE according to embodiments of the present disclosure. In the following, pp denotes a common parameter. In this case, pp is a m-by-n matrix A sampled uniformly at random from a field $\mathbb{Z}_q^{m \times n}$ where m≥3n. Again, set t=O(log n). In addition, another field $\mathbb{Z}_Q$ Step 3. Sample a uniform random m-bit binary string r and m-by-n matrix B from $\mathbb{Z}_Q^{m \times n}$, and sample a length m-vector e from discrete Gaussian distribution $D_{\mathbb{Z},\alpha}^m$.

Step 4. Compute a length m vector h=Bs+e+(Q/2)r. This can be considered as a processing of obfuscating a random string r under weak secret key s by using a weak black-box multi-bit input obfuscator with multi-bit outputs (see Literature Reference No. 8).

Step 5. Set the public helper string p=(c, B, h).

Step 6. Output (p,r)

---

−(p, r) ← Gen(pp, w):
1. Sample s ∈ $\mathbb{Z}_q^n$ uniformly.
2. Parse pp as A; let c = As + w.
3. Sample r ∈ {0, 1}$^m$, B ∈ $\mathbb{Z}_Q^{m \times n}$ uniformly, and sample e ← $\mathcal{D}_{\mathbb{Z},\alpha}^m$.
4. Let h = Bs + e + $\frac{Q}{2}$r.
5. Let p = (c, B, h).
6. Output (p, r).
−r' ← Rec(pp, w', p):
1. Parse p as (c, B, h); let b = c − w'.
2. Parse pp as A; compute s' = Decode$_t$ (A, b).
3. For each coordinate i ∈ [m]:
   (a) If the i-th coordinate of $h - Bs \in \left[\frac{3Q}{8}, \frac{5Q}{8}\right]$,
   then the i-th coordinate of r' is 1.
   (b) Else if the i-th coordinate of h − Bs is less than $\frac{Q}{8}$ or greater than $\frac{7Q}{8}$,
   then the i-th coordinate of r' is 0.
   (c) Else, output ⊥ and halt.
4. Output the reconstructed string r' ∈ {0,1}$^m$.

--- is used such that Q is a prime of super-polynomial (e.g., $2^{\omega(\log n)}$) in n (e.g. Q=2$^n$). Note that each entry of some m-by-n matrix B in $\mathbb{Z}_Q^{m \times n}$ can be expressed by ω(log n) bits (e.g., n bits). One can consider $\mathbb{Z}_q$ as a subfield of $\mathbb{Z}_Q$ so that the field operations between elements from $\mathbb{Z}_q$ and $\mathbb{Z}_Q$ are preserved under $\mathbb{Z}_Q$. Also note that $D_{\mathbb{Z},\alpha}^m$ is a m-dimensional discrete Gaussian distribution with smoothing parameter α over $\mathbb{Z}_Q$ (see Literature Reference No. 9), where α is set to be a super-polynomial (e.g., $2^{\omega(\log n)}$). A formal description of algorithms for the reusable fuzzy extractor according to embodiments of the present disclosure is provided below.

(3.3.1) Generation Algorithm Gen

Figure 5:
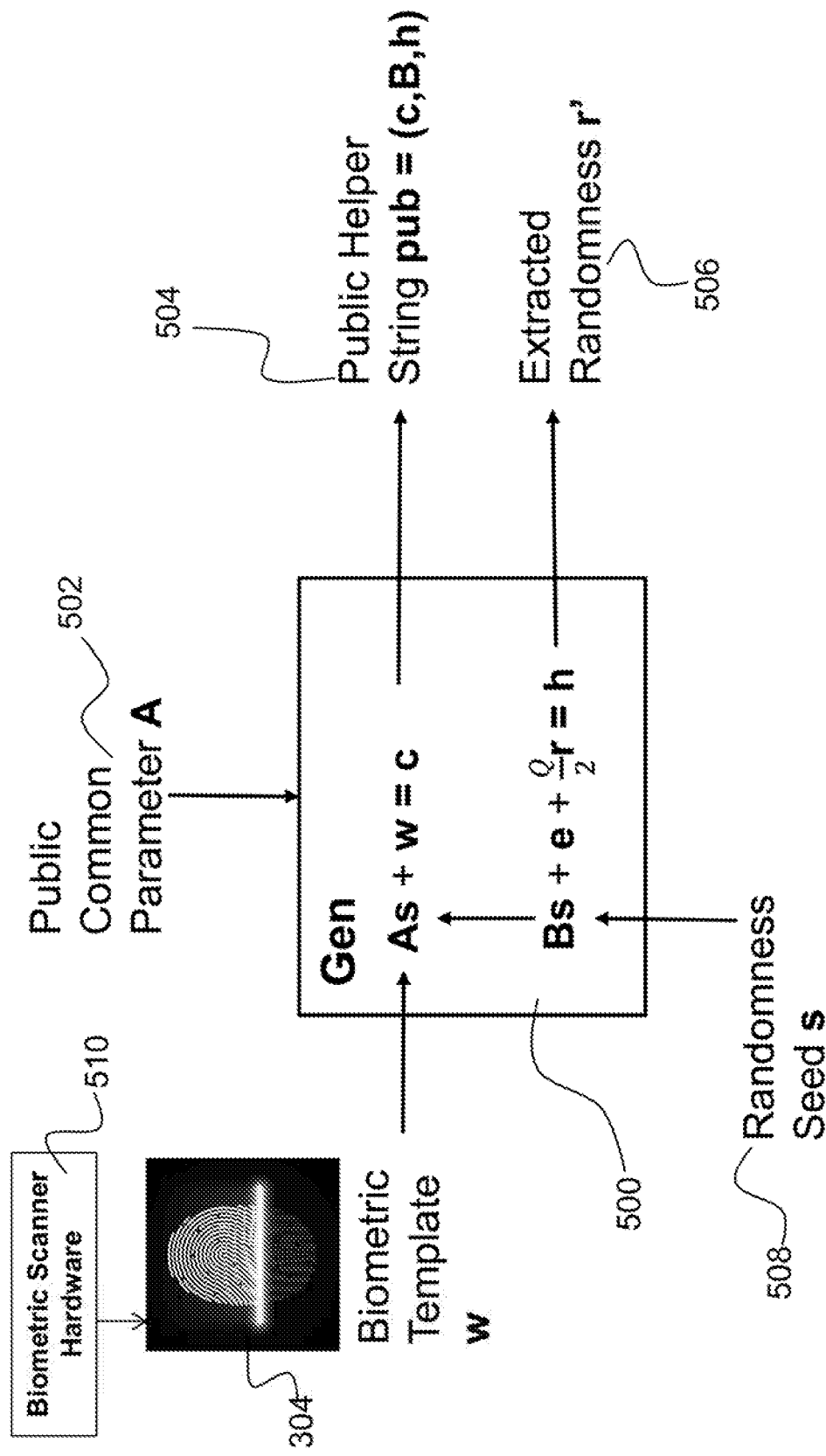
FIG. 5 is an illustration of the algorithm Gen according to some embodiments of the present disclosure.

As shown in FIG. 5, the algorithm Gen 500 (called "generation" algorithm), takes as input a public parameter pp (element 502) and a vector w of length m, where w is a generated based on a biometric reading 304. h represents a vector, which is considered an obfuscated vector of r with secret key s. The outputs of algorithm Gen 500 are a public helper string p (element 504) and extracted randomness r' (element 506). The biometric template 304 (biometric data) is obtained from biometric scanner hardware 510, such as a fingerprint scanner or an eye scanner, such as an iris or retinal scanner.

Step 1. It samples a random length n secret vector s (element 508). Looking ahead, this is the seed to extract the final randomness r (element 506).

Step 2. From the public parameter pp (element 502), obtain a m-by-n matrix A from $\mathbb{Z}_q^{m \times n}$ and compute the public helper string c=As+w (element 504).

(3.3.2) Reconstruction Algorithm Rec

The input to the algorithm Rec (called "reconstruction" algorithm), denoted by Rec takes as input a public parameter pp, a vector w' of length m, where w' is a generated based on a biometric reading, and a public helper string p which contains a length-m vector c over $\mathbb{Z}_q$, a m-by-n matrix B in $\mathbb{Z}_Q^{m \times n}$ and a length-m vector h over $\mathbb{Z}_Q$. The output of algorithm Rec is an extracted randomness r'.

Step 1. Obtain a tuple (c, B, h) from input public helper string p and compute b=c−w'.

Step 2. Obtain a m-by-n matrix A from input public parameter pp and obtain a length n vector s' by executing Decode$_t$(A,b).

Step 3. Using the extracted s', it obtains the final randomness r' from h as described above. To do so, it first computes h−Bs' which is a length-m vector over $\mathbb{Z}_Q$. Only if the i-th coordinate of r was 1, then the i-th coordinate of h−Bs' is placed between $$\left[\frac{3Q}{8}, \frac{5Q}{8}\right],$$

with probability at least 1−(½)$^n$.

Step 4. Output r'.

Figure 6:
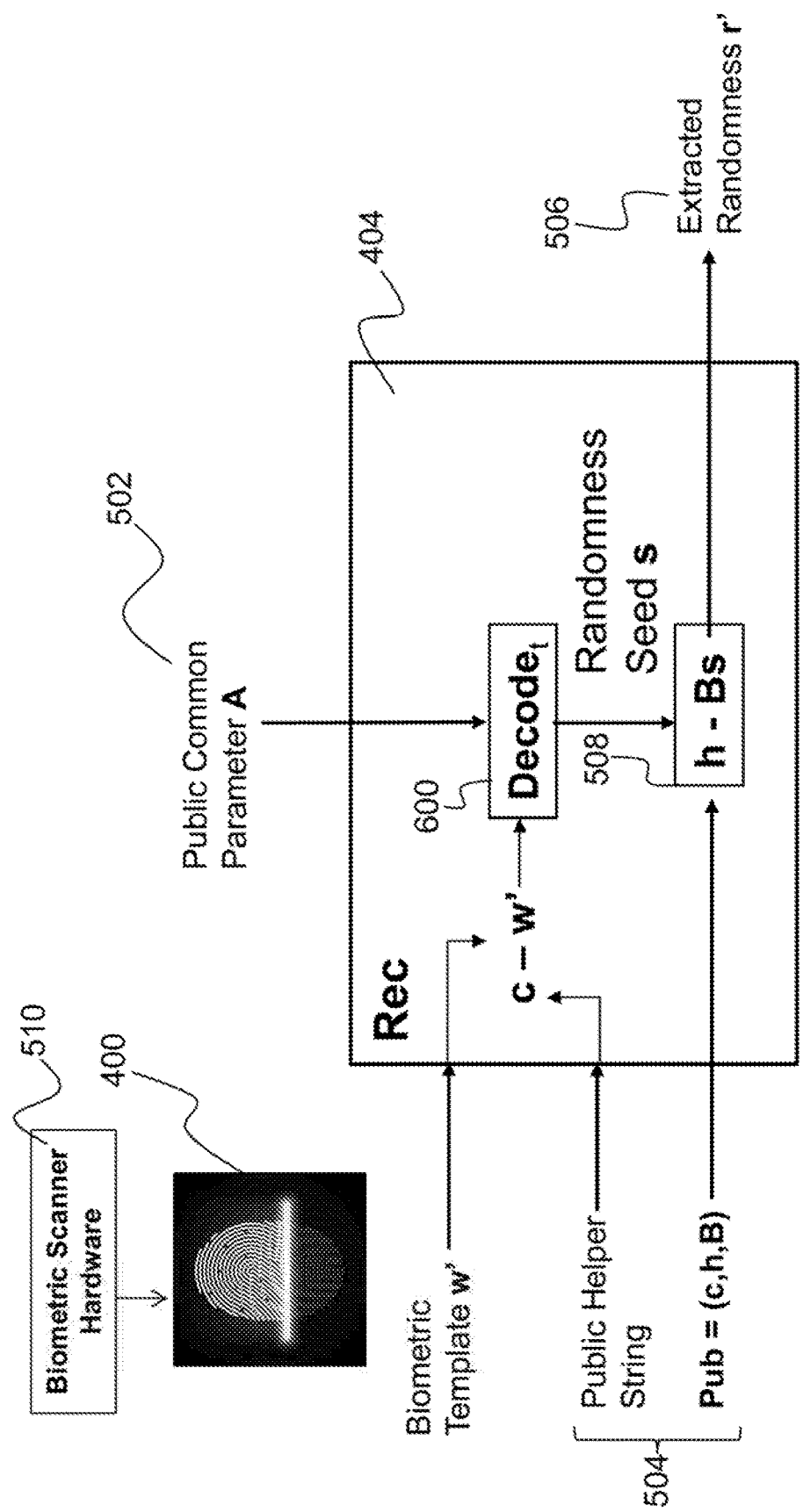
FIG. 6 is an illustration of the algorithm Rec according to some embodiments of the present disclosure.

FIG. 6 depicts the pictorial description of algorithm Rec. The input to the Reconstruction algorithm Rec (element 404) is a public parameter pp, a vector w', where w' is a generated based on a biometric template (element 400), and a public helper string p (element 504). The output of algorithm Rec (element 404) is an extracted randomness r (element 506). A matrix A (element 502) is obtained from input public parameter pp, and a randomness seed (element 508) is obtained by executing Decode$_t$ (element 600). The output is extracted randomness r (element 406).

(3.4) Estimated Performance

The size of the public helper string depends on the order of underlying algebraic field. Let the order be Q, and let the length of the biometric in terms of number of field elements be m. Note that $Q=2^n$. Thus, the size of the public helper string in the number of bits is $O((\log Q)*m)=O(n*m)=O(m^2)$. The running time of the reconstruction algorithm Rec in terms of number of field element multiplications is $O(m*n)$ multiplications. The performance of the RFE according to embodiments of the present disclosure is expected to be faster (at least by 100 times) than prior art (see Literature Reference Nos. 1 and 3). The running time of algorithm Gen is expected to be somewhat slower than the running time of algorithm Rec due to the complexity of discrete Gaussian sampling according to $D_{\mathbb{Z},\alpha}^m$ in the Step 3 of algorithm Gen's description above. However, the recent advancement of discrete Gaussian sampling (see Literature Reference No. 9) is expected to guarantee a faster running time of algorithm Gen than the ones proposed by Literature Reference Nos. 1 and 3. In addition, the efficiency of algorithm Gen is less important than the efficiency of algorithm Rec, since the algorithm Gen is expected to be a one-time process that occurs at the point of initial enrollment of biometric data.

(3.5) Security of the Reusable Fuzzy Extractor (Gen, Rec)

The reusable security of the fuzzy extractor according to embodiments of the present disclosure is guaranteed based on the hardness of the learning-with-error (LWE) problem. The reusable security implies that even if an adversary is given multiple public helper strings, which are generated based on the (possibly noisy) biometric readings of a single biometrics, the adversary cannot obtain any information on the original biometrics or the randomness supposedly extracted by the original biometrics. Most other fuzzy extractor works do not provide the reusable security so that if an adversary is given more than one public helper string, then the adversary can extract significant information on the original biometrics as well as the extracted randomness.

The LWE problem is believed to be a hard problem even against quantum adversaries, since no efficient quantum algorithm has been proposed so far. The best-known algorithm to solve the lattice problem reduced to the LWE problem is a strictly exponential time algorithm in its dimension. Since the reusable fuzzy extractor described herein only relies on the hardness of LWE problem, it provides the reusable security against quantum adversaries without any other hardness additional assumptions.

In the invention according to embodiments of the present disclosure, a reusable fuzzy extractor that does not rely on the use of random oracle's strong security property is described. To do so, a LWE-based technique is utilized to achieve the necessary security guarantee. In more detail, the LWE-based technique of Literature Reference No. 8 is applied to construct a cryptographic tool which can be used in place of a random oracle with a cost of overhead in the size of the public helper string, where the overhead is approximately linear in the length of biometrics.

The invention described herein can be used as a biometric based identification or authentication system (or other types of biometric based systems, such as a key exchange system), or subsystem for other cryptosystems that can utilize noisy biometric information as a cryptographic key. For example, one can build a biometric based identification system used by a user Alice and a server Bob as follows. When Alice wants to enroll with her fingerprint m at the server Bob, the server Bob runs Gen(m) and obtains pub and r. Then, Bob encrypts a message "Alice||correct" using r as a cryptographic key for a symmetric encryption scheme. Bob stores only pub and the resulting ciphertext c and erases r from the system. Later, Alice may want to access the database of server Bob. Then, Bob can authenticate the Alice's credential as it reads Alice's fingerprint m' and runs Rec(pub, m') to obtain r'. Note that m' might be a noisy version of the original fingerprint m but two readings are close enough so that r'=r (i.e., sufficiently similar).

A similarity metric is used to determine similarity between m and m'. The similarity metric is directly relevant to the authentication security level, which is dependent upon the application domain. For instance, high security will be achieved if two biometric inputs are identical. For example, one agency may require 80% similarity rate to identify a security risk while another agency may require 95% similarity to let an internal member access classified information. Finally, Bob decrypts c by using r' to obtain the message "Alice||correct" to verify that the person attempting to access the database is indeed Alice.

In this example, secured data in the database is unlocked by applying the cryptographic key for biometric security of access to the secured data. For instance, if the database requires 95% similarity between fingerprint scans or retinal/iris scans to gain access to secured data in the database, then biometric data (e.g., fingerprint, iris scan, retinal scan) is converted into a cryptographic key using a reusable fuzzy extractor process as described above. In a generation process, the system described herein takes as input a public parameter and, for instance, a first/original fingerprint scan and outputs a public helper string and a first random string. When a user wants to attempt to access the secure data, the system according to embodiments of the present disclosure then takes as input the user's fingerprint scan (a second fingerprint scan). If the second fingerprint scan has 95% similarity to the first fingerprint scan, then the database is unlocked. In other words, the user is able to gain access to the secured data in the database.

As can be appreciated by one skilled in the art, the system may comprise a fingerprint scanner or eye scanner (e.g., iris scanner, retinal scanner) for obtaining the biometric data. A fingerprint scanner is hardware that uses fingerprints for biometric authentication to verify and authenticate identity. Iris scanning biometrics measure unique patterns in the colored circle of an eye to verify and authenticate identity. Iris-based identification requires specific hardware to be used, such as an iris scanner. A retinal scanner uses unique patterns on a person's retina blood vessels for authentication.

The RFEs in Literature Reference No. 2 are secure under Boyen's notion of RFE, which can be improved. Thus, the RFE system according to embodiments of the present disclosure offers better security guarantee. The RFE described herein relies on the computational hardness assumption known as decisional Learning-with-Error problem (LWE) (see Literature Reference No. 4), which can be implemented with simple and efficient operations such as matrix and vector multiplications. All previous results relied on the existence of very expensive cryptographic tools.

Figure 7:
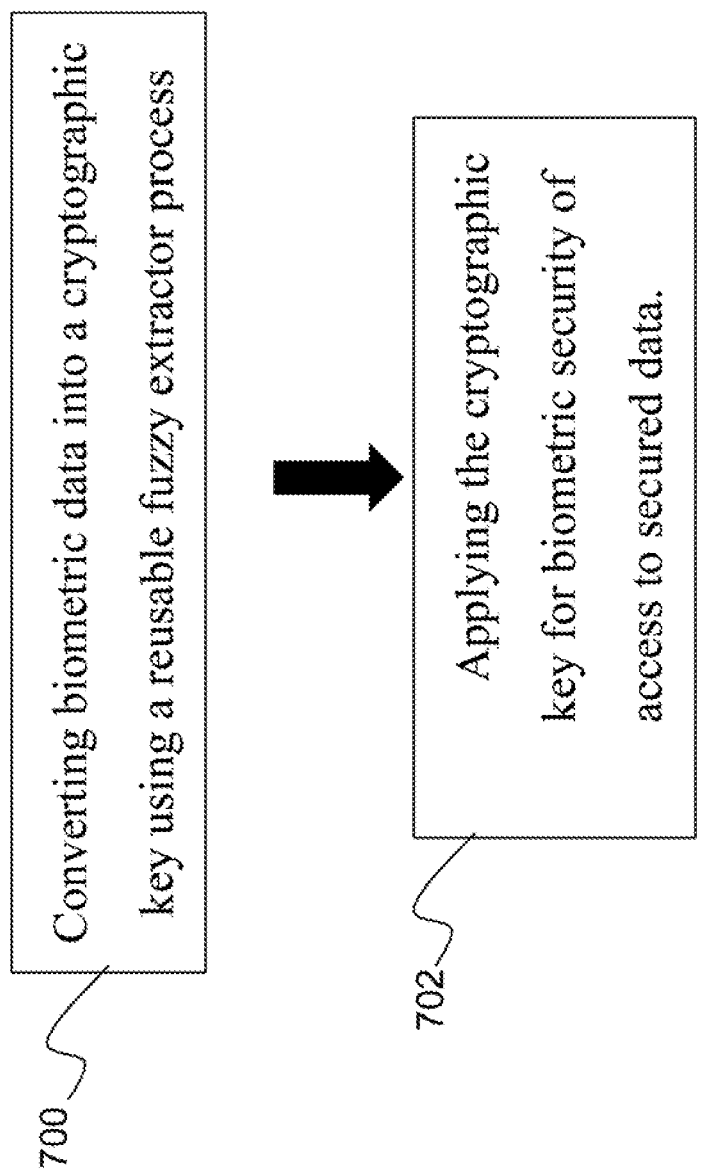
FIG. 7 is a flow diagram illustrating a RFE cryptographic system according to some embodiments of the present disclosure.

In summary, the fuzzy extractor described herein is reusable such that multiple public helper strings do not reveal any information on the original biometrics or the corresponding extracted randomness under the assumption that the LWE problem is hard. Moreover, the reusable fuzzy extractor (RFE) has a (practically) relatively small size of public helper string. For the same biometric template of size 100 bits and the same number of possible errors (e.g., at most 10 bits are erroneous out of 100 bits), the size of the public helper string of the RFE of this disclosure is only less than 100 KB whereas the size of other RFEs providing the similar reusable security (e.g., see Literature Reference Nos. 1 and 3) is more than 3 MB. The whole reusable fuzzy extractor system described herein is secure against quantum adversaries only under the LWE assumption. No other assumption is required. FIG. 7 is a flow diagram illustrating a RFE cryptographic system according to embodiments of the present disclosure, where the system converting biometric data into a cryptographic key using a reusable fuzzy extractor process (element 700), and the cryptographic key is applied for biometric security of access to secured data (element 702).

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for biometric based security, the system comprising:
    a scanner configured to provide biometric data; and
    one or more processors and a non-transitory computer-readable medium having executable instructions encoded thereon such that when executed, the one or more processors perform an operation of:
        converting biometric data into a cryptographic key for accessing a secured data using a reusable fuzzy extractor process,
        wherein the reusable fuzzy extractor process comprises a generation process and a reconstruction process, wherein the generation process takes as input a public parameter and a first biometric input related to the biometric data and outputs a public helper string and a first random string, and wherein the reconstruction process takes as input the public helper string and a second biometric input related to the biometric data and outputs a second random string,
        wherein reusability of the reusable fuzzy extractor process guarantees that multiple public helper strings can be generated using multiple biometric inputs related to the biometric data without revealing any biometric data.

2. The system as set forth in claim 1, wherein the reusable fuzzy extractor process is secure against quantum adversaries only under a learning-with-error (LWE) assumption.

3. The system as set forth in claim 1, wherein when the first random string is considered equivalent to the second random string, the one or more processors further perform an operation of verifying access to the secured data using the second random string.

4. The system as set forth in claim 1, wherein security of the reusable fuzzy extractor process is guaranteed based on a computational hardness assumption of a learning-with-error (LWE) problem.

5. The system as set forth in claim 1, wherein the biometric data is a fingerprint and the secured data is accessed through a server.

6. The system as set forth in claim 1, wherein the one or more processors further perform operations of:
    performing the generation process for obtaining the public helper string and the first random string;
    encrypting a message using the first random string as a cryptographic key for a symmetric encryption scheme, resulting in a ciphertext; and
    storing the public helper string.

7. A system for biometric based security, the system comprising:
    one or more processors and a non-transitory computer-readable medium having executable instructions encoded thereon such that when executed, the one or more processors perform an operation of:
        receiving biometric data from a scanner;
        obtaining a ciphertext with an associated first random string and encrypted message;
        authenticating the biometric data by performing a reconstruction process which takes as input a public helper string and the biometric data and outputs a second random string;
        determining whether the second random string is equivalent to the first random string;
        decrypting the ciphertext using the second random string; and
        obtaining the message for authentication of the biometric data.

8. A computer implemented method for biometric based security, the method comprising an act of:
    causing one or more processors to execute instructions encoded on a non-transitory computer-readable medium, such that upon execution, the one or more processors perform operations of:
        receiving biometric data from a scanner; and
        converting the biometric data into a cryptographic key for accessing a secured data using a reusable fuzzy extractor process,
        wherein the reusable fuzzy extractor process comprises a generation process and a reconstruction process, wherein the generation process takes as input a public parameter and a first biometric input related to the biometric data and outputs a public helper string and a first random string, and wherein the reconstruction process takes as input the public helper string and a second biometric input related to the biometric data and outputs a second random string,
        wherein reusability of the reusable fuzzy extractor process guarantees that multiple public helper strings can be generated using multiple biometric inputs related to the biometric data without revealing any biometric data.

9. The method as set forth in claim 8, wherein the reusable fuzzy extractor process is secure against quantum adversaries only under a learning-with-error (LWE) assumption.

10. The method as set forth in claim 8, wherein when the first random string is considered equivalent to the second random string, the one or more processors performs an operation of verifying access to the secured data using the second random string.

11. The method as set forth in claim 8, wherein security of the reusable fuzzy extractor process is guaranteed based on a computational hardness assumption of a learning-with-error (LWE) problem.

12. The method as set forth in claim 8, wherein the biometric data is a fingerprint and the secured data is accessed through a server.

13. The method as set forth in claim 8, wherein the one or more processors further perform operations of:
performing the generation process for obtaining the public helper string and the first random string;
encrypting a message using the first random string as a cryptographic key for a symmetric encryption scheme, resulting in a ciphertext; and
storing the public helper string.

14. A computer-implemented method for biometric based security, the method comprising an act of:
causing one or more processors to execute instructions encoded on a non-transitory computer-readable medium, such that upon execution, the one or more processors perform operations of:
receiving biometric data from a scanner;
obtaining a ciphertext with an associated first random string and encrypted message;
authenticating the biometric data by performing a reconstruction process which takes as input a public helper string and the biometric data and outputs a second random string;
determining whether the second random string is equivalent to the first random string;
decrypting the ciphertext using the second random string; and
obtaining the message for authentication of the biometric data.

15. A computer program product for biometric based security, the computer program product comprising:
computer-readable instructions stored on a non-transitory computer-readable medium that are executable by a computer having one or more processors for causing the processor to perform operations of:
converting biometric data into a cryptographic key for accessing a secured data using a reusable fuzzy extractor process,
wherein the reusable fuzzy extractor process comprises a generation process and a reconstruction process,
wherein the generation process takes as input a public parameter and a first biometric input related to the biometric data and outputs a public helper string and a first random string, and wherein the reconstruction process takes as input the public helper string and a second biometric input related to the biometric data and outputs a second random string,
wherein reusability of the reusable fuzzy extractor process guarantees that multiple public helper strings can be generated using multiple biometric inputs related to the biometric data without revealing any biometric data.

16. The computer program product as set forth in claim 15, wherein the reusable fuzzy extractor process is secure against quantum adversaries only under a learning-with-error (LWE) assumption.

17. The computer program product as set forth in claim 15, wherein when the first random string is considered equivalent to the second random string, the one or more processors performs an operation of verifying access to the secured data using the second random string.

18. The computer program product as set forth in claim 15, wherein security of the reusable fuzzy extractor process is guaranteed based on a computational hardness assumption of a learning-with-error (LWE) problem.

19. The computer program product as set forth in claim 15, wherein the biometric data is a fingerprint and the secured data is accessed through a server.

20. The computer program product as set forth in claim 15, further comprising instructions for causing the one or more processors to further perform operations of:
performing the generation process for obtaining the public helper string and the first random string;
encrypting a message using the first random string as a cryptographic key for a symmetric encryption scheme, resulting in a ciphertext; and
storing the public helper string.

21. The system as set forth in claim 1, wherein the scanner is a fingerprint scanner.

22. The system as set forth in claim 1, wherein the scanner is an eye scanner.

* * * * *